Nov. 23, 1965     K. O. WALKER     3,218,751
SINKER WITH RELEASABLY ATTACHED PLUG
Filed April 12, 1962
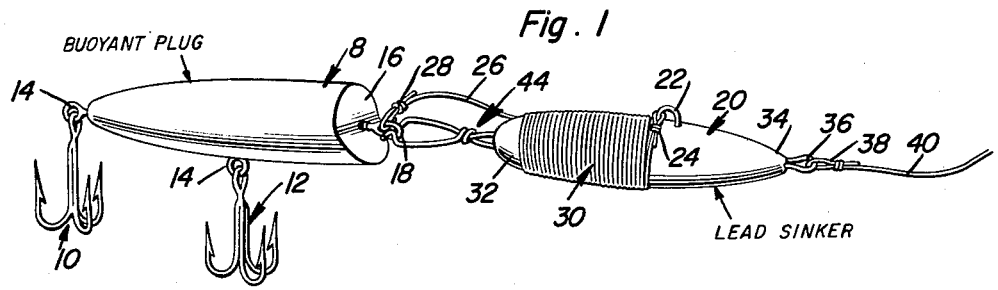
Fig. 1
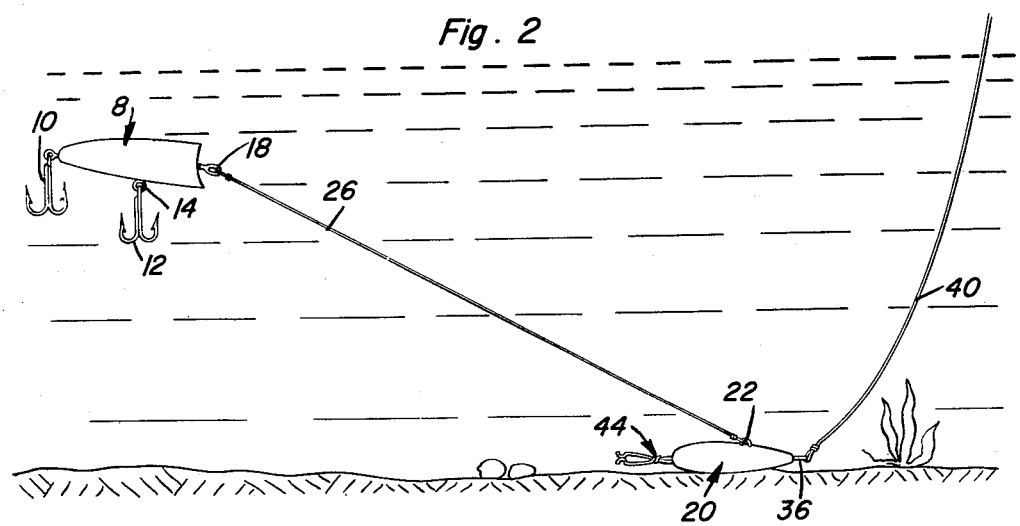
Fig. 2
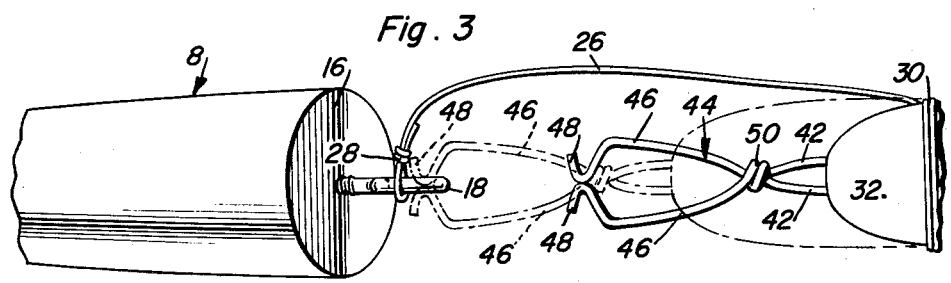
Fig. 3
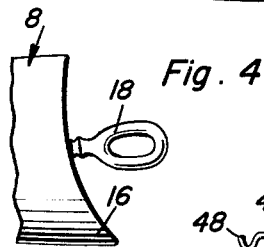
Fig. 4
Fig. 5
Kenneth O. Walker
INVENTOR.
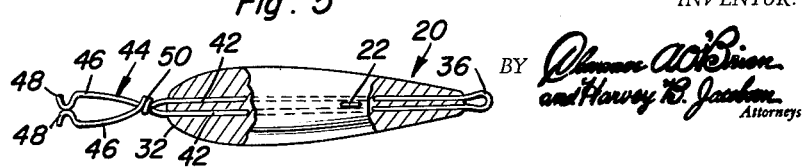

United States Patent Office 3,218,751
Patented Nov. 23, 1965

3,218,751
SINKER WITH RELEASABLY ATTACHED PLUG
Kenneth O. Walker, Yuba City, Calif., assignor of twenty-five percent to Mark Niesen, Pacoima, Calif.
Filed Apr. 12, 1962, Ser. No. 187,046
4 Claims. (Cl. 43—43.11)

This invention relates to fishing tackle characterized by a buoyant lure, a sinker, a leader and a fishing line combination wherein the lure is adapted to remain above but close to the bottom of the water which is being fished.

Briefly, the present invention comprises a hook-equipped buoyant plug, the latter having an end of a leader of predetermined length connected thereto. This plug is also equipped at one end with a fixed eye providing a keeper. The companion sinker is constructed to permit an end of the leader to be attached thereto and wrapped thereon. Clip means on one end of the sinker permits suitable detents on the free ends of the fingers of the clip means to be connected to the keeper, thus separably joining the plug to the sinker until the cast has been completed. When the line, which is attached to the sinker, is jerked the lure is released and the sinker descends to the water's bottom.

An object of the invention is to structurally, functionally and in other ways improve upon tackle of the above-described character and wherein a plug having hooks and which is of suitable construction and design is provided at the leading or head end with a simple eye screw which functions as a keeper and also permits an end of a leader to be attached thereto.

Another object of the invention is to provide a sinker in combination with the plug and which, more particularly construed, is constructed to permit the major portion of the leader to be wound or wrapped thereon, the median portion of the surface of the sinker having a staple to which the coacting end of the leader is connected. One end of the sinker is provided with a line-attaching eye and the other end is provided with resilient specially designed fingers which coact in providing a snap-type clip, the latter being detachably connected with the aforementioned keeper eye.

With the herein disclosed component parts properly constructed and assembled the user may successfully cast his lure to a desired fishing spot without encountering the likelihood of either the lure or leader fouling the fishing line. Then and at the desired time and with a slight jerk on the line the sinker will release the lure or plug and allow the sinker and lure to go to the bottom. Thus the fisherman is allowed to fish close to the bottom.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of the improved tackle with the component parts thereof rigged in preparation for the intended cast;

FIGURE 2 is a view in side elevation with the parts on a relatively small scale and showing the sinker on the water's bottom and the buoyant lure or plug elevated thereabove but attached thereto by a leader;

FIGURE 3 is a view in elevation on a larger scale showing cooperating end portions of the plug and sinker respectively and also showing in full and phantom lines the manner in which one end of the sinker is separably latched or clipped to the coacting end of the lure;

FIGURE 4 is a fragmentary view in elevation of an end portion of the lure detailing the keeper; and FIGURE 5 is a view in section and elevation of the sinker and the expedients carried thereby.

In the drawing the lure comprises a suitably constructed buoyant plug 8 having fishhook means 10 and 12 connected to median and end portions thereof by appropriate screw eyes 14. The headed or leading end of the plug 16 is provided with an axial projecting screw eye 18 which functions as a keeper eye.

The sinker, which is made of lead or equivalent heavy material, is denoted by the numeral 20 and is of elongated shape, the body portion being preferably circular in cross section and provided on a peripheral surface with a radial or outstanding staple 22. One end portion 24 of a leader 26 is connected to the staple and the other end portion of this leader is connected as at 28 to the aforementioned keeper eye 18. In practice the major portion of the leader is adapted to be wound or wrapped tightly around the portion of the sinker as at 30, that is between the tapered trailing end 32 and the staple 22. The leading tapered end 34 is provided with a suitable projecting eye 36 to which an end portion 38 of the fishing line 40 is connected. More particularly the eye 36 is fashioned from the bent portion of a length of wire which is embedded axially in the lead sinker in the manner shown in FIG. 5. The bent portions of the limbs 42 extend through and beyond the trailing end 32 and the projecting end portions are bent and fashioned into a pull released or pull responsive connecting clip 44. More specifically this clip (also designated as resilient latch means) comprises a pair of resilient fingers 46 which have free terminal ends bent upon themselves into V-shaped form as at 48 to provide detents, said detents being releasably connected to the keeper eye in the manner illustrated in full lines in FIG. 1 and phantom lines in FIG. 3. It may be desirable to twist the median portions of the latching fingers together as at 50 to impose a desired degree of tension thereon.

Since it would be within the purview of the concept to provide the keeper means on the sinker and the latching fingers or clip means on the plug in a manner opposite to that actually illustrated in the views of the drawing, the quick separable connecting means between adjacent cooperating ends of the sinker and plug is to be construed accordingly.

The lure or plug 8 and sinker 20 are separably coupled together and rigged in FIG. 1 in readiness to make the desired cast. To accomplish this the major portion of the leader 26 is wrapped firmly or coiled tightly around the lefthand half-portion of the sinker, that is between the anchor point 22 of the leader and lefthand end portion 32 of the sinker. The detents or catches 48 simply snap into the keeper eye as illustrated.

Thus the fisherman is now in a position to cast the lure and sinker to the desired fishing spot. Then with a slight jerk of the line the sinker will release the lure and allow the sinker and lure to go to the bottom as shown in FIG. 2 and which also illustrates the elevated fishing position of the then released lure or plug.

It is believed that a careful consideration of the description in conjunction with the illustrated figures of the drawing will enable the reader to obtain a clear and comprehensive understanding of the subject matter of the invention, the features and advantages, and best mode of using the same. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Fishing tackle which enables the user to fish close to the bottom of the water which is being fished comprising, in combination, a buoyant hook-equipped plug which when in use is floatable above but relatively close to said bottom, a sinker which when in use rests on said bottom, means positively but separably connecting the trailing end of said sinker with the leading end of said plug, said means serving to connect the plug and sinker together during the cast but allowing the sinker to separate itself from the plug when the cast has been completed, a leader carried by said plug, said sinker having means permanently connecting the forward end of the leader thereto, said leader being of a length that a major portion of said leader is susceptible of being releasably wrapped around a portion of said sinker prior to initiating the cast, said connecting means comprising an eye providing a keeper and clip means, said clip means embodying a pair of resilient latching fingers terminating in free latchable ends separably connected to said keeper.

2. The structure according to claim 1, and wherein said keeper eye is fixed to and projects axially beyond the leading end of said plug, the rearward end of said leader being fixed to said keeper eye, said clip means being fixed to the trailing end of said sinker, and said resilient latching fingers projecting rearwardly and axially beyond said trailing end and being oriented with and cooperatively located between the adjacent coacting ends of the plug and sinker, respectively, whereby to facilitate making the aforementioned separable connection between said latchable ends and said keeper.

3. The structure defined in claim 2, and wherein said permanent connecting means for the forward end of said leader comprises a staple fixed on said sinker intermediate the ends thereof.

4. Fishing tackle which enables the user thereof to fish close to the bottom of the water which is being fished comprising, in combination, a buoyant hook-equipped plug which after being cast assumes a position close to but elevated above said bottom, said plug having leading and trailing ends, the leading end being provided with an axially located projecting screw eye which constitutes a keeper, a leader of a predetermined length having one end thereof connected to said keeper eye, an elongated sinker having an eye at its leading end for the attachment thereto of an adjacent end of a fishing line, said sinker being provided at its trailing end with a pair of cooperating resilient latching fingers, said fingers having free end portions provided with a pair of coacting V-shaped terminals constituting detents, said detents being releasably connected with said keeper eye and permitting the sinker to be separably coupled to the plug so that the sinker and plug may then be cast as an assembly, said sinker being provided intermediate its ends on one side with a staple, an adjacent end of said leader being connected with said staple, said leader being of a length that a major portion thereof may be manually wrapped around the surface of the sinker to permit the cast to be undertaken and successfully accomplished and to thereafter permit the windings to unwind so that the sinker may descend to the water's bottom after the cast has been completed and said detents have been released from said keeper eye.

References Cited by the Examiner
UNITED STATES PATENTS

| | | | |
|---|---|---|---|
| 1,555,004 | 9/1925 | Gregory | 131—258 |
| 2,275,869 | 3/1942 | Seaton | 43—42.04 |
| 2,399,298 | 4/1946 | Sevegny | 43—44.88 |
| 2,413,371 | 12/1946 | Parker | 43—43.11 |
| 2,592,441 | 4/1952 | Louthan | 43—43.11 |
| 2,796,692 | 6/1957 | Harley | 43—42.04 |

ABRAHAM G. STONE, *Primary Examiner.*

JOSEPH S. REICH, *Examiner.*